Dec. 26, 1950  L. A. STENGEL  2,535,989
PRODUCTION OF ALKALI METAL NITRATES
Filed Aug. 30, 1946
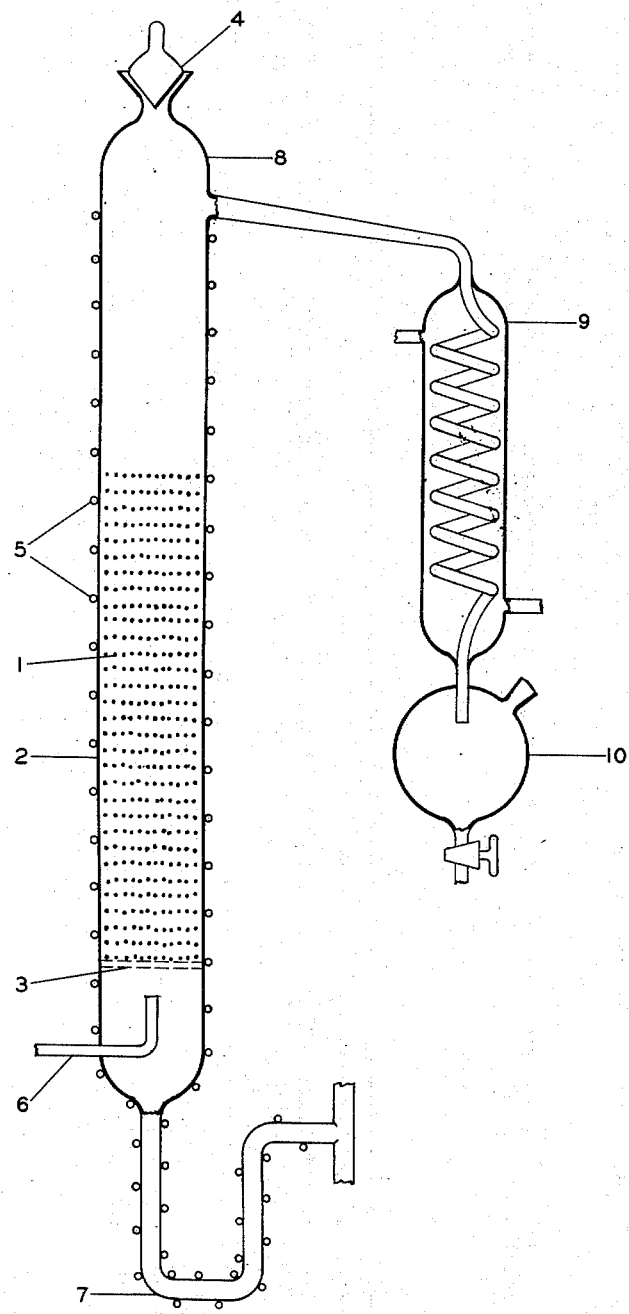
INVENTOR
Leonard A. Stengel
BY Francis M. Crawford
ATT'Y Patented Dec. 26, 1950

2,535,989

UNITED STATES PATENT OFFICE 2,535,989

PRODUCTION OF ALKALI-METAL NITRATES

Leonard A. Stengel, Terre Haute, Ind., assignor to Commercial Solvents Corporation, Terre Haute, Ind., a corporation of Maryland Application August 30, 1946, Serial No. 694,133

12 Claims. (Cl. 23—102)

My invention relates to the production of alkali-metal nitrates, and more particularly to a process for producing alkali-metal nitrates by contacting alkali-metal chlorides with nitrating gases at elevated temperatures.

The production of alkali-metal nitrates by cheap and convenient means is a problem that has occupied chemists for many years, and has resulted in the issuance of a very large number of patents covering numerous methods and modifications of methods for accomplishing the desired purpose. Most of the patents deal with variations of three basic processes: (1) ion exchange between an alkali-metal chloride and a soluble nitrate in aqueous solution; (2) treatment of an alkali-metal chloride in aqueous solution with nitric acid or with a gas containing nitrogen oxides; and (3) treatment of solid alkali-metal chlorides with various nitrating gases.

All of the prior-art processes possess serious shortcomings. In the first general process cited above, the desired alkali-metal nitrate must be separated by fractional crystallization—a tedious and expensive procedure at best. In the second general process cited above, the provision of a suitable reaction vessel is a serious problem, owing to the extremely corrosive nature of the mixture of hydrochloric acid and nitric acid ("aqua regia") that is produced in the process. Moreover, the desired alkali-metal nitrate must be separated from the resulting solution by evaporation and crystallization—a difficult procedure owing to the corrosive nature of the material, and an expensive one because of the poor heat economy in the evaporation of such materials and because of the necessity for carrying out the evaporation and crystallization in a multiplicity of steps. The third prior-art process cited above is subject to at least two serious shortcomings: It is difficult from an operational standpoint to charge large quantities of solids into a reaction column and then after treating them in the desired manner to remove the resultant solid product from the column, especially if it is desired to perform these operations in a continuous manner. But of far greater significance from an economic point of view is the fact that in the prior-art process the treatment of solid alkali-metal chlorides with nitrating gases requires around 144 hours to produce complete conversion of chlorides into the desired nitrates. It will be obvious to those skilled in the art that a reaction period of such excessive duration must result in exceedingly poor heat economy and in an exceedingly low output of product for a reaction unit of given size.

I have now discovered that the nitration of alkali-metal chlorides proceeds at a very rapid rate if the chlorides are treated with nitrating gases at temperatures at or above the melting points of the corresponding nitrates. I have discovered, moreover, that in the absence of any considerable proportion of infusible impurities, the resulting alkali-metal nitrates may be removed from the reaction zone in a molten condition, thus providing a process that is extremely convenient in application, and that is adaptable to operation on a continuous basis.

In one specific embodiment of my invention, an alkali-metal chloride such as potassium chloride is converted into the nitrate by contact with nitric acid vapors in an apparatus as illustrated in the single figure. Potassium chloride 1, preferably in the form of small pellets or granules, is introduced through a normally closed charging-port 4 into a vertical tubular reaction chamber 2, where the pellets are supported by a perforated plate 3. Suitable pyrometric devices, not illustrated, are located at various points within the apparatus. The reaction vessel and its contents are heated to a temperature of 334° C., the melting point of potassium nitrate, or above, by application of a suitably regulated electrical potential to a nichrome resistance winding 5 around the reaction vessel. Hot nitric acid vapors, preferably preheated to the reaction temperature, are introduced into the bottom of the reactor through pipe 6, from which they pass upward through and react with the bed of solid potassium chloride. The resultant potassium nitrate melts and flows downward through the perforated plate 3, into a heated liquid seal 7, and out into a suitable receptacle. The vaporous products of reaction and the unreacted nitric acid vapors pass out of the reactor through a second opening 8 at the top, and are subsequently cooled in a condenser 9, from which they pass into a separator 10. From the bottom of the separator, a mixture comprising nitric acid, hydrochloric acid, and water is drawn off, and from the top of the separator issues a mixture of non-condensable gases comprising nitrogen oxides, nitrosyl chloride, and chlorine. In this process it is evident that the melt of alkali metal nitrate which is formed in the reaction is drained off and removed from contact with the solid alkali metal chloride substantially as fast as it is formed.

It will be obvious to those skilled in the art that numerous modifications of the apparatus illustrated in the figure will be beneficial in the adaptation of my process to commercial operation. For example, by installing a hopper, a worm feed, a star valve, or a similar device at the top of the reactor, it will be possible to feed the alkali-metal chloride intermittently or continuously into the reactor, and continuous operation of the process will then become feasible. It is evident also that the reaction vessel may be heated by more economical means, such as by the use of a gas-fired furnace surrounding the unit, by the use of a circulating heat-transfer liquid such as dowtherm, for example, or a molten salt-mixture, such as a mixture of sodium nitrate and potassium nitrate, or by superheating the nitrating vapors sufficiently to maintain the desired temperature.

Alternatively, I may introduce alkali-metal chlorides into a rotary kiln and contact them while being agitated at a temperature at or above the melting point of the alkali-metal nitrates with a countercurrent stream of nitrating vapors. The alkali-metal nitrates and any infusible diluents are removed from the lower end of the rotary kiln, and the unreacted nitrating vapors and the gaseous products of reaction are removed from the upper end of the kiln. It will be obvious to those skilled in the art that in this modification of my process, alkali-metal chlorides containing substantial quantities of infusible impurities may be processed continuously, since the impurities are removed conveniently in combination with the desired alkali-metal nitrates.

My process may be operated in such a manner as to produce nitrates containing as little as from about 0.01 to 2% chlorides, depending primarily on the contact time of the melt with the nitrating vapors. By constructing the reactor in such a way as to follow longer and more intimate contact of the melt with fresh nitrating vapors, the chloride content of the product may be reduced to substantially any desired level.

The reaction vessel employed in my process, together with most of the associated lines and equipment, should be made of or lined with acid-resistant materials, owing to the corrosive nature of the raw materials and products under the conditions employed. Silicon carbide is especially well suited for this purpose because of its excellent resistance to corrosion and its high thermal conductivity. Other acid-resistant refractories such as silica and special high-silica metallic alloys such as durichlor may also be used. In those parts of the apparatus that are not in contact with the liquid-vapor nitric acid interphase at high temperature, or in contact with hydrogen chloride or hydrochloric acid, special steels such as "18-8 stainless steel" (18% chromium, 8% nickel) are suitable.

It is to be distinctly understood that my invention is not limited to the types of apparatus described above, but may be carried out in any type of apparatus which would be recognized as suitable by those skilled in the art.

In the application of my process, I prefer to work with pure or relatively pure alkali-metal chlorides, from which I obtain the corresponding alkali-metal nitrates as a melt in substantially pure form. The latter may be converted directly into flakes in a known manner; or, after solidification, it may be crushed, pulverized, or comminuted to reduce it to any desired state of subdivision.

I may also process relatively impure alkali-metal chlorides according to my invention, obtaining therefrom a product comprising the molten nitrates ordinarily mixed with solid impurities, which may be separated by settling and decantation, by centrifugation, or by filtration. From the difficulties involved in such operations, it is clearly apparent that the alkali-metal chlorides used in my process should preferably contain as small a proportion of impurities as possible.

I have found it advantageous in carrying out the process of my invention to start with a mixture of alkali-metal chlorides, preferably in such proportion as will produce the eutectic mixture of the resulting nitrates. For example, a mixture containing 47 mole per cent potassium chloride and 53 mole per cent sodium chloride will give the eutectic mixture of potassium nitrate and sodium nitrate melting at 219° C. The melting point of the resulting product may be varied at will up to the melting point of the individual constituents by a suitable change in the proportions of the components. The use of such mixtures, where the mixtures of cations in the product is not objectionable, offers the distinct advantage of permitting a lower temperature of reaction than would be feasible with either of the individual components. Analogously, it would be possible to reduce the operating temperature even further by incorporating additional components of a suitable type in order to produce a multi-component eutectic mixture.

The chlorides of the entire class of alkali metals, consisting of lithium, sodium, potassium, rubidium, and cesium, are operative in my process. Certain minerals, such as halite, sylvite, and sylvinite, may also be converted into nitrates readily by my process, and are especially desirable raw materials because of their purity, cheapness, and convenient form. Sylvinite ore from New Mexico, a mixture of sodium and potassium chlorides, which is the source of most of the potash used in the United States, is particularly desirable.

As the nitrating gas in my process I may use vaporized nitric acid of substantially any concentration, including the so-called "fuming" nitric acid. I have also found it feasible to use a mixture comprising vaporized nitric acid and nitrogen dioxide, and I have not observed any undesirable effects from the presence of oxygen or of inert diluent gases such as, for example, nitrogen and carbon dioxide, in the nitrating gases.

While I have found that nitric acid of substantially any concentration may be used in my process, nevertheless it will be apparent that the use of fuming nitric acid or nitric acid approaching 100% purity would be uneconomical because of the cost of the acid; and the use of very dilute nitric acid would be uneconomical because of the cost of vaporizing the excessive quantities of water in the acid. For economic reasons, therefore, I choose to use acid ranging in concentration from about 10 per cent to about 70 per cent by weight. I prefer, however, to use acid below about 35% by weight, since I have discovered unexpectedly that when such acid is used in my process, the output of noncondensable gases is reduced to a very low level, and the problem of utilizing the vaporous effluent from the process is reduced to a minimum. The higher the concentration of nitric acid, above about 35%, the greater the output of noncondensable gases, comprising nitrogen oxides, nitrosyl chloride, and chlorine.

The temperature employed in my process should be at least as high as the melting point of the alkali-metal nitrate or mixture of alkali-metal nitrates derivable from the starting materials, for I have observed, as reported in the prior art, that the reaction is extremely slow at lower temperatures. The melting points of the pure alkali-metal nitrates and of the sodium-potassium nitrate eutectic mixture are cited as illustrations in the following table:

| Alkali-Metal Nitrate | Melting Point |
|---|---|
| | °C. |
| Lithium | 255 |
| Sodium | 308 |
| Potassium | 334 |
| Rubidium | 310 |
| Cesium | 414 |
| Sodium-potassium, 53:47 molar | 219 |

The permissible maximum temperature is not so critical, but should be below the temperature at which the decomposition of nitric acid or the alkali-metal nitrates becomes objectionable. I have processed a mixture of sodium and potassium chlorides, for example, at 550° C. with good yields of the nitrates, despite the fact that the nitrates begin to decompose at 380 and 400° C., respectively. At very short nitric acid vapor contact times, for example, one second or less, I have observed that very little decomposition of the acid or nitrates occurs even at extremely high temperatures. I prefer, however, to operate within the lower portion of the permissible temperature range in order to minimize heat losses and corrosion difficulties.

One of the principal advantages of my process is the extreme rapidity with which the nitration reaction takes place, compared with the processes of the prior art. I have achieved a conversion of nitric acid into alkali-metal nitrates as high as 67% of theoretical with a nitric acid vapor contact time of only one second. Unlike the minimum temperature, moreover, the vapor contact time is not a critical variable in my process. Ordinarily, I prefer to operate with a vapor contact time within the range of about one-tenth second to about one minute or more, calculated on the basis of the free space within the reaction zone and the actual volumes of gaseous reactants under the actual operating conditions; however, it will be obvious that my process is operative over a considerably wider range than the one I prefer to use.

The following examples are given to illustrate my invention:

Example I

Into an apparatus as illustrated in the figure, having an inside diameter of 2.25 inches and a length of 20 inches, were introduced 184 grams of granular potassium chloride, the reactor was heated to 360° C., and vapors of 62.5% nitric acid were passed into the bottom of the reactor at a rate of 3 grams per minute, additional potassium chloride being supplied from time to time to keep the average quantity present within the reactor approximately constant. After the reaction had started, a melt consisting almost entirely of potassium nitrate collected in the bottom of the reactor, and was drawn off, and a liquid comprising nitric acid and hydrochloric acid was condensed from the effluent vapors. As soon as the product rate had become constant, the products were collected for a period of 59 minutes, and were subsequently analyzed. It was found that 92.8 grams of potassium nitrate and a condensate comprising 33 grams of nitric acid and 13 grams of hydrochloric acid had been produced, plus a considerable volume of noncondensable gases. From the foregoing data, it was calculated that potassium nitrate had been produced in a conversion of 52.4% and a yield of 75.2%, based on nitric acid. If this test had been continued, the above data show that the original charge of 184 grams of KCl would have been entirely converted to $KNO_3$ in about 2.7 hours.

Example II

Vaporized nitric acid of 52.0% concentration was passed into granular potassium chloride (341 grams initially charged) at 365° C. at a rate of 2 grams per minute, as described in Example I. The reaction products during a 3.6-hour period comprised 197.5 grams of molten potassium nitrate, 78.8 grams of nitric acid, 43.5 grams of hydrochloric acid, and 4000 ml. of noncondensable gases. The potassium nitrate was produced in 54.3% conversion and 83.0% yield, based on nitric acid.

Example III

Sylvinite (a mixture of sodium and potassium chlorides) was nitrated as described in Example I by passing vapors of 41.3% nitric acid at a rate of 0.8 gram per minute through the crushed ore (370 grams initially charged) at 295° C. for a total of 7.5 hours. The effluent vapors contained almost no noncondensable gases, and the condensate during a 7.5-hour period was found to comprise 54.7 grams of nitric acid and 54.0 grams of hydrochloric acid. From the bottom of the reactor was simultaneously withdrawn a melt of sodium and potassium nitrates corresponding to a conversion of 65.5%, based on nitric acid.

Example IV

Sylvinite, having an analysis of 26.6% Na, 18.4% K, 54.5% Cl, and 2.2% of other materials such as iron and silica, was nitrated continuously in an apparatus similar to that described in Example I, but having an effective reaction zone of 800 ml., by passing vapors of 29.2% nitric acid, preheated to 220° C., at a rate of 14.7 grams per minute through the crushed ore at 300° C. From the bottom of the reactor was withdrawn continuously an average of 240 grams per hour of a melt analyzing 36% potassium nitrate, 62% sodium nitrate, 0.13% chloride, and the remainder inerts. From the separator was withdrawn an average of 720 milliliters of condensate per hour analyzing 13.06 grams of hydrochloric acid per 100 ml. and 10.74 grams of nitric acid per 100 ml. From the foregoing data, it was calculated that the nitrates were produced in a conversion of 65.5% and a yield of 95.0%, based on nitric acid.

Example V

Granular potassium chloride was treated at 360° C. with vapors of 22.6% nitric acid at the rate of 0.6 gram per minute. The effluent vapors were found to contain no noncondensable gases, and the condensate during a 15.5-hour period was found to comprise 55.7 grams of nitric acid and 39.3 grams of hydrochloric acid. Molten potassium nitrate weighing 108 grams was simultaneously withdrawn from the bottom of the reactor, corresponding to a conversion of 53.5% and a yield of 96.0%, based on nitric acid.

Example VI

Lithium chloride was treated with 41.3% nitric acid at 270° C. as described in Example I. A melt comprising essentially lithium nitrate was withdrawn from the bottom of the reactor.

It is understood that the foregoing examples are submitted for illustration only, and are not intended to limit the application of my invention to the specific materials, steps, and apparatus described therein. In general, it may be said that any modifications or equivalents that would ordinarily occur to those skilled in the art are to be considered as lying within the scope of my invention.

In accordance with the foregoing specification, I claim as my invention:

1. In the manufacture of alkali metal nitrates from alkali metal chlorides, the process which comprises passing a stream of a nitrating gas through a mass of solid granular alkali metal chloride at a temperature above the melting point of the alkali metal nitrate formed in the process but below temperatures causing any substantial decomposition of the alkali metal nitrate and below the melting point of the alkali metal chloride, thereby forming a melt of alkali metal nitrate, and removing said melt from contact with the solid chloride substantially as fast as it is formed.

2. The process of claim 1 wherein the mass of alkali metal chloride is in the form of a column and the nitrating gas is passed upwardly through said column.

3. The process of claim 1 wherein the mass of alkali metal chloride is agitated and contacted in counter-current with said stream of nitrating gas.

4. The process of claim 1 wherein the nitrating gas comprises the vapors of a nitric acid having a concentration ranging from about 10 to 70 per cent by weight.

5. The process of claim 1 wherein the nitrating gas comprises the vapors of a nitric acid having a concentration within the range of about 10 to 35 per cent by weight.

6. The process of claim 1 wherein the contact time of the nitrating gas with said alkali metal chloride is within the range of from about one-tenth second to one minute.

7. The process of claim 1 wherein the mass of alkali metal chloride is a mixture of sodium and potassium chlorides in such proportions as to produce a sodium-potassium nitrate eutectic mixture.

8. The process of claim 1 wherein the mass of alkali metal chloride is sylvinite.

9. The process of claim 1 wherein the alkali metal chloride is potassium chloride and the temperature employed is above 334° C.

10. The process of claim 1 wherein the alkali metal chloride is sodium chloride and the temperature employed is above 308° C.

11. The process of claim 1 wherein the alkali metal chloride is lithium chloride and the temperature employed is above 255° C.

12. In the manufacture of alkali metal nitrates from the corresponding chlorides, the process which comprises establishing and maintaining a column of a granular alkali metal chloride in a vertical reaction zone, passing nitric acid vapors having a concentration within the range of 10 to 70% by weight upwardly through said column while maintaining said column at a temperature above the melting point of the nitrate formed in the process but below the decomposition temperature of said nitrate and below the melting point of the alkali metal chloride, withdrawing and condensing vapors from the top of the column, draining fused nitrate from the bottom of the column substantially as fast as it is formed and withdrawing it from the reaction zone in fused condition.

LEONARD A. STENGEL.

REFERENCES CITED

The following references are of record in the file of this patent:

UNITED STATES PATENTS

| Number | Name | Date |
|---|---|---|
| 1,809,191 | Brown et al. | June 9, 1931 |
| 1,875,014 | Kaselitz | Aug. 30, 1932 |
| 2,007,478 | Rosenstein | July 9, 1935 |

Certificate of Correction

Patent No. 2,535,989                                                                         December 26, 1950

LEONARD A. STENGEL

It is hereby certified that error appears in the printed specification of the above numbered patent requiring correction as follows:

Column 3, line 37, for "0 01" read *0.01*; line 40, for the word "follow" read *allow*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*